(12) United States Patent
Xie et al.

(10) Patent No.: US 12,499,579 B2
(45) Date of Patent: Dec. 16, 2025

(54) METHOD AND APPARATUS FOR REGISTERING DEVICES OF AUTONOMOUS VEHICLE BASED ON TRAJECTORY ALIGNMENT

(71) Applicant: BEIJING BAIDU NETCOM SCIENCE TECHNOLOGY CO., LTD., Beijing (CN)

(72) Inventors: Qingqing Xie, Beijing (CN); Yanfu Zhang, Beijing (CN); Jiali Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 598 days.

(21) Appl. No.: 17/809,358

(22) Filed: Jun. 28, 2022

(65) Prior Publication Data

US 2022/0327740 A1 Oct. 13, 2022

(30) Foreign Application Priority Data

Jun. 29, 2021 (CN) .......................... 202110727800.3

(51) Int. Cl.
*G06T 7/80* (2017.01)
*B60W 60/00* (2020.01)
(Continued)

(52) U.S. Cl.
CPC ............ *G06T 7/80* (2017.01); *G01C 21/1656* (2020.08); *G06T 7/33* (2017.01); *G06T 7/73* (2017.01);
(Continued)

(58) Field of Classification Search
CPC .... G06T 7/80; G06T 7/33; G06T 7/73; G06T 2207/30204; G06T 2207/30241;
(Continued)

(56) References Cited

U.S. PATENT DOCUMENTS

| 2008/0195315 | A1  | 8/2008 | Hu et al. |
| 2020/0088858 | A1* | 3/2020 | Li ........................... G01S 7/497 |
| 2021/0134013 | A1* | 5/2021 | Carlsson ............. H04N 13/246 |

FOREIGN PATENT DOCUMENTS

| CN | 109345596 A | 2/2019 |
| CN | 110033489 A | 7/2019 |

(Continued)

OTHER PUBLICATIONS

Office Action issued in Chinese Application No. 202110727800.3 mailed on Jul. 28, 2023 (22 pages).
(Continued)

*Primary Examiner* — Christopher Wait
(74) *Attorney, Agent, or Firm* — Osha Bergman Watanabe & Burton LLP (57) ABSTRACT

A registration method and a registration apparatus for an autonomous vehicle is provided. The method includes: generating a first trajectory curve based on first detection poses of a vehicle-mounted camera at a plurality of first time points, generating a second trajectory curve based on second detection poses of a vehicle-mounted positioning device at a plurality of second time points, aligning the first trajectory curve with the second trajectory curve based on the first detection poses and the second detection poses, and registering the vehicle-mounted camera and the vehicle-mounted positioning device based on the first trajectory curve and the second trajectory curve aligned with each other.

15 Claims, 6 Drawing Sheets

(51) Int. Cl.
*G01C 21/16* (2006.01)
*G06T 7/33* (2017.01)
*G06T 7/73* (2017.01)

(52) U.S. Cl.
CPC ..... *B60W 60/001* (2020.02); *B60W 2420/403* (2013.01); *G06T 2207/30204* (2013.01); *G06T 2207/30241* (2013.01); *G06T 2207/30244* (2013.01); *G06T 2207/30252* (2013.01)

(58) Field of Classification Search
CPC . G06T 2207/30244; G06T 2207/30252; G06T 2207/10016; G06T 7/30; G06T 7/70; G01C 21/1656; G01C 21/30; G01C 25/00; G01C 25/005; B60W 60/001; B60W 2420/403
See application file for complete search history.

(56) References Cited

FOREIGN PATENT DOCUMENTS

| | | |
|---|---|---|
| CN | 112304321 A | 2/2021 |
| CN | 112348903 A | 2/2021 |
| CN | 112789655 A | 5/2021 |
| JP | 2010190721 A | 9/2010 |
| JP | 2020046427 A | 3/2020 |
| WO | 2006035755 A1 | 4/2006 |

OTHER PUBLICATIONS

Search Report for issued for EP application 22181594.7, mailed Nov. 28, 2022 (15 pages).

Jonathan Kelly et al. "A General Framework for Temporal Calibration of Multiple Proprioceptive and Exteroceptive Sensors;" Department of Computer Science, University of Southern California (15 pages).

Decision of Refusal issued in Japanese Application No. 2022-104121, mailed on May 30, 2023 (6 pages).

Extended European Search Report issued in European Application No. 22181594.7, mailed on Mar. 20, 2023 (16 pages).

Belaroussi et al.; "Vehicle Attitude Estimation in Adverse Weather Conditions using a Camera, a GPS and a 3D road Map;" IEEE Intelligent Vehicles Symposium (IV); Jun. 5-9, 2011; pp. 782-787 (6 pages).

* cited by examiner

METHOD AND APPARATUS FOR REGISTERING DEVICES OF AUTONOMOUS VEHICLE BASED ON TRAJECTORY ALIGNMENT

CROSS REFERENCE TO RELATED APPLICATION

This application is based on and claims priority to Chinese Patent Application No. 202110727800.3, filed on Jun. 29, 2021, the entire content of which is hereby incorporated by reference for all purposes.

TECHNICAL FIELD

The disclosure relates to a field of artificial intelligence (AI) technologies such as autonomous driving and intelligent transportation, and particularly to a registration method and a registration apparatus for an autonomous vehicle.

BACKGROUND

In a driving process of an autonomous vehicle, sensing and positioning of a vehicle body are complete by a cooperative operation of a plurality of sensors. A precondition of the cooperative operation of the plurality of sensors is that a coordinate transformation relationship between sensors is known, and the coordinate transformation relationship between the sensors may be pre-calibrated. For example, on various existing unmanned vehicle platforms, more accurate positioning and sensing may be completed by a camera and a positioning device (such as an inertial measurement device (IMU)).

SUMMARY

The disclosure provides a registration method and a registration apparatus for an autonomous vehicle.

According to a first aspect of the disclosure, a registration method for an autonomous vehicle is provided. The method includes: generating a first trajectory curve based on first detection poses of a vehicle-mounted camera at a plurality of first time points; generating a second trajectory curve based on second detection poses of a vehicle-mounted positioning device at a plurality of second time points; aligning the first trajectory curve with the second trajectory curve based on the first detection poses and the second detection poses; and registering the vehicle-mounted camera and the vehicle-mounted positioning device based on the first trajectory curve and the second trajectory curve aligned with each other.

According to a second aspect of the disclosure, a registration apparatus for an autonomous vehicle is provided. The apparatus includes: at least one processor; and a memory communicatively connected to the at least one processor. The memory is stored with instructions executable by the at least one processor, and when the instructions is performed by the at least one processor, the at least one processor is configured to:
generate a first trajectory curve based on first detection poses of a vehicle-mounted camera at a plurality of first time points; generate a second trajectory curve based on second detection poses of a vehicle-mounted positioning device at a plurality of second time points; align the first trajectory curve with the second trajectory curve based on the first detection poses and the second detection poses; and register the vehicle-mounted camera and the vehicle-mounted positioning device based on the first trajectory curve and the second trajectory curve aligned with each other.

According to a third aspect of the disclosure, a non-transitory computer readable storage medium stored with computer instructions is provided, the computer instructions are configured to perform a registration method for an autonomous vehicle by the computer. The method includes: generating a first trajectory curve based on first detection poses of a vehicle-mounted camera at a plurality of first time points; generating a second trajectory curve based on second detection poses of a vehicle-mounted positioning device at a plurality of second time points; aligning the first trajectory curve with the second trajectory curve based on the first detection poses and the second detection poses; and registering the vehicle-mounted camera and the vehicle-mounted positioning device based on the first trajectory curve and the second trajectory curve aligned with each other.

BRIEF DESCRIPTION OF THE DRAWINGS

The drawings are intended to better understand the solution, and do not constitute a limitation to the disclosure.

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

In the related art, a process for calibrating a camera and a positioning device includes: generating a motion trajectory of the camera through a visual positioning technology, and aligning the motion trajectory of the camera with a trajectory point of the positioning device at the nearest time, thereby achieving calibration of the camera and the positioning device.

However, due to positioning dimension degradation, scale ambiguity and the like caused by feature extraction robustness and visual field problems, and the motion trajectory obtained through the visual positioning technology tends to be inaccurate, resulting in a poor calibration effect. Moreover, data of the camera and the positioning device is usually triggered and acquired non-synchronously, and only the trajectory point of the positioning device at the nearest time is used to align with the trajectory point of the camera without considering a trajectory change caused by a time difference. Therefore, a better calibration parameter may be difficult to be obtained by aligning with the positioning device using such trajectory.

Therefore, with regards to the problem, the disclosure provides a registration method and a registration apparatus for an autonomous vehicle, an electronic device and a vehicle.

A registration method and a registration apparatus for an autonomous vehicle, an electronic device and a vehicle are described below referring to the accompanying drawings in embodiments of the disclosure.

Figure 1:
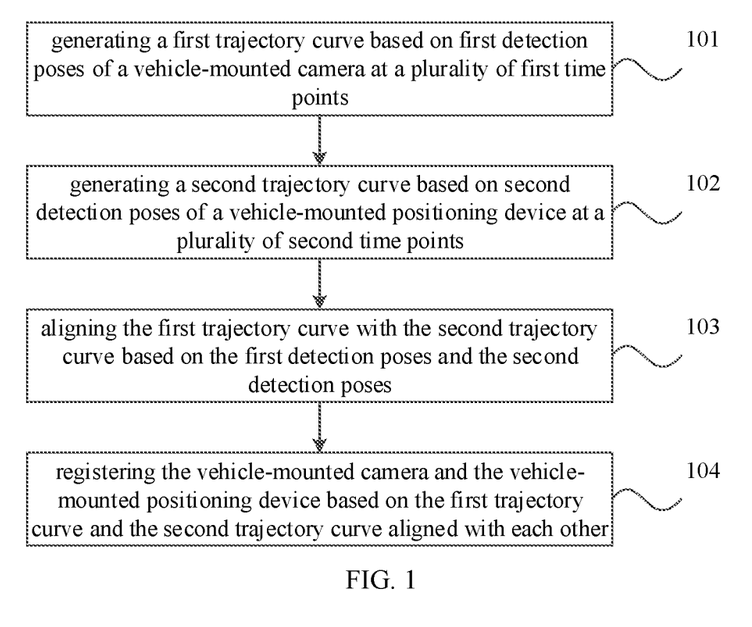
FIG. 1 is a flowchart illustrating a registration method for an autonomous vehicle according to a first embodiment of the disclosure.

FIG. 1 is a flowchart illustrating a registration method for an autonomous vehicle according to a first embodiment of the disclosure.

The embodiment is illustrated by the registration method for the autonomous vehicle being configured in a registration apparatus for an autonomous vehicle. The registration apparatus may be applied to any electronic device to cause the electronic device to perform a registration function.

The electronic device may be any device with computation ability, for example, may be a personal computer (PC), a mobile terminal, a server, etc. The mobile terminal may be a hardware device with various operating systems, a touch screen and/or a display screen, such as a vehicle device, a mobile phone, a tablet computer, a personal digital assistant and a wearable device.

As illustrated in FIG. 1, the registration method for the autonomous vehicle may include the following blocks.

At block 101, a first trajectory curve is generated based on first detection poses of a vehicle-mounted camera at a plurality of first time points.

In the embodiment of the disclosure, the first detection pose refers to a pose of a vehicle-mounted camera in a world coordinate system. The pose may include a coordinate position and/or a posture.

In the embodiment of the disclosure, the first detection pose at each first time point may be determined based on an image acquired by the vehicle-mounted camera at the corresponding time point. It may be described in subsequent embodiments, which will not be repeated here.

In the embodiment of the disclosure, curve fitting may be performed on the first detection poses of the vehicle-mounted camera at the plurality of first time points, to obtain the first trajectory curve corresponding to the vehicle-mounted camera.

At block 102, a second trajectory curve is generated based on second detection poses of a vehicle-mounted positioning device at a plurality of second time points.

In the embodiment of the disclosure, a vehicle-mounted positioning device refers to a sensor that may achieve positioning, position measurement and posture measurement, for example, the vehicle-mounted positioning device may be an IMU.

In the embodiment of the disclosure, the second detection pose refers to a pose detected by the vehicle-mounted positioning device.

In the embodiment of the disclosure, the curve fitting may be performed on the second detection poses of the vehicle-mounted positioning device at the plurality of second time points, to obtain the second trajectory curve corresponding to the vehicle positioning vehicle.

At block 103, the first trajectory curve is aligned with the second trajectory curve based on the first detection poses and the second detection poses.

In the embodiment of the disclosure, the first trajectory curve is aligned with the second trajectory curve based on the first detection poses corresponding to the vehicle-mounted camera and the second detection poses corresponding to the vehicle-mounted positioning device. For example, for each first detection pose, the second detection pose matched with the first detection pose may be determined, for example, the matched second detection pose may be a pose most similar to the first detection pose, and the first trajectory curve may be aligned with the second trajectory curve based on each first detection pose and each second detection pose matched with each first detection pose.

At block 104, the vehicle-mounted camera and the vehicle-mounted positioning device are registered based on the first trajectory curve and the second trajectory curve aligned with each other.

In the embodiment of the disclosure, the vehicle-mounted camera and the vehicle-mounted positioning device may be registered based on the first trajectory curve and the second trajectory curve aligned. Therefore, the first trajectory curve of the vehicle-mounted camera is aligned with the second trajectory curve of the vehicle-mounted positioning device based on pose, and the vehicle-mounted camera and the vehicle-mounted positioning device are registered based on the alignment result, which may avoid a poor registration effect (that is, a calibration effect) caused due to alignment based on time, and improve accuracy of a registration calibration or a calibration result.

In the registration method for the autonomous vehicle in the embodiment of the disclosure, the first trajectory curve is generated based on the first detection poses of the vehicle-mounted camera at the plurality of first time points, and the second trajectory curve is generated based on the second detection poses of the vehicle-mounted positioning device at the plurality of second time points, and the first trajectory curve is aligned with the second trajectory curve based on the first detection poses and the second detection poses, to register the vehicle-mounted camera and the vehicle-mounted positioning device based on the first trajectory curve and the second trajectory curve aligned with each other. Therefore, the first trajectory curve of the vehicle-mounted camera is aligned with the second trajectory curve of the vehicle-mounted positioning device based on pose, and the vehicle-mounted camera and the vehicle-mounted positioning device are registered based on the alignment result, which may avoid the poor registration effect (that is, the calibration effect) caused due to the alignment based on time, and improve the accuracy of the calibration result.

In order to clearly describe how the first trajectory curve is aligned with the second trajectory curve in the above embodiment, the disclosure provides another registration method for an autonomous vehicle.

Figure 2:
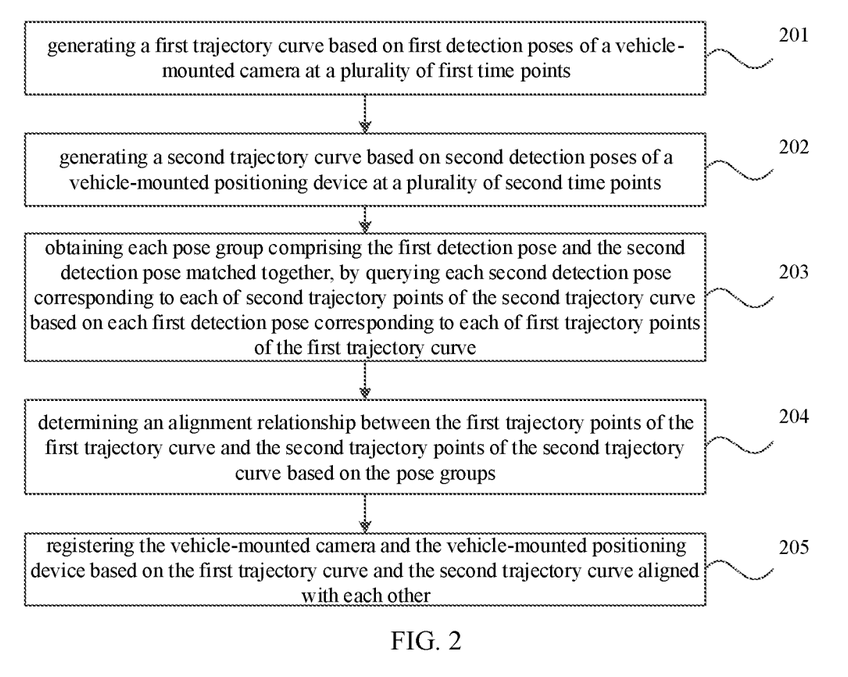
FIG. 2 is a flowchart illustrating a registration method for an autonomous vehicle according to a second embodiment of the disclosure.

FIG. 2 is a flowchart illustrating a registration method for an autonomous vehicle according to a second embodiment of the disclosure.

As illustrated in FIG. 2, the registration method for the autonomous vehicle may include the following blocks.

At block 201, a first trajectory curve is generated based on first detection poses of a vehicle-mounted camera at a plurality of first time points.

At block 202, a second trajectory curve is generated based on second detection poses of a vehicle-mounted positioning device at a plurality of second time points.

The execution process of blocks 201 to 202 may refer to an execution process of any embodiment in the disclosure, which will not be repeated here.

At block 203, each pose group including the first detection pose and the second detection pose matched together is obtained by querying each second detection pose corresponding to each of second trajectory points of the second trajectory curve, based on each first detection pose corresponding to each of first trajectory points of the first trajectory curve.

In the embodiment of the disclosure, for each first trajectory point of the first trajectory curve, the first detection pose corresponding to the first trajectory point may be matched with the second detection pose corresponding to each second trajectory point of the second trajectory curve, to determine the second detection pose having a highest matching degree with the first detection pose corresponding to the first trajectory point, and the first detection pose and the second detection pose having the highest matching degree with the first detection pose are determined as the pose group including the first detection pose and the second detection pose matched together.

At block 204, an alignment relationship between the first trajectory points of the first trajectory curve and the second trajectory points of the second trajectory curve is determined based on the pose groups.

In the embodiment of the disclosure, the alignment relationship between the first trajectory points of the first trajectory curve and the second trajectory points of the second trajectory curve may be determined based on the pose groups each including the first detection pose and the second detection pose matched together. That is, each first trajectory point and each second trajectory point respectively corresponding to the first detection pose and the second detection pose matched together may be aligned to obtain the alignment relationship between the first trajectory points of the first trajectory curve and the second trajectory points of the second trajectory curve.

At block 205, the vehicle-mounted camera and the vehicle-mounted positioning device are registered based on the first trajectory curve and the second trajectory curve aligned with each other.

The execution process of block 205 may refer to an execution process of any embodiment in the disclosure, which will not be repeated here.

In the registration method for the autonomous vehicle in the embodiment of the disclosure, each pose group including the first detection pose and the second detection pose matched together may be obtained by querying each second detection pose corresponding to each of second trajectory points of the second trajectory curve based on each first detection pose corresponding to each of first trajectory points of the first trajectory curve; and the alignment relationship between the first trajectory points of the first trajectory curve and the second trajectory points of the second trajectory curve is determined based on the pose groups. Therefore, the first trajectory points of the first trajectory curve may be aligned with the second trajectory points of the second trajectory curve based on pose, and subsequently the vehicle-mounted camera and the vehicle-mounted positioning device may be calibrated based on the alignment result, which may avoid a poor calibration effect caused due to alignment based on time, and improve accuracy of a calibration result.

In order to clearly describe how the vehicle-mounted camera and the vehicle-mounted positioning device are registered in the above embodiment, the disclosure provides another registration method for an autonomous vehicle.

Figure 3:
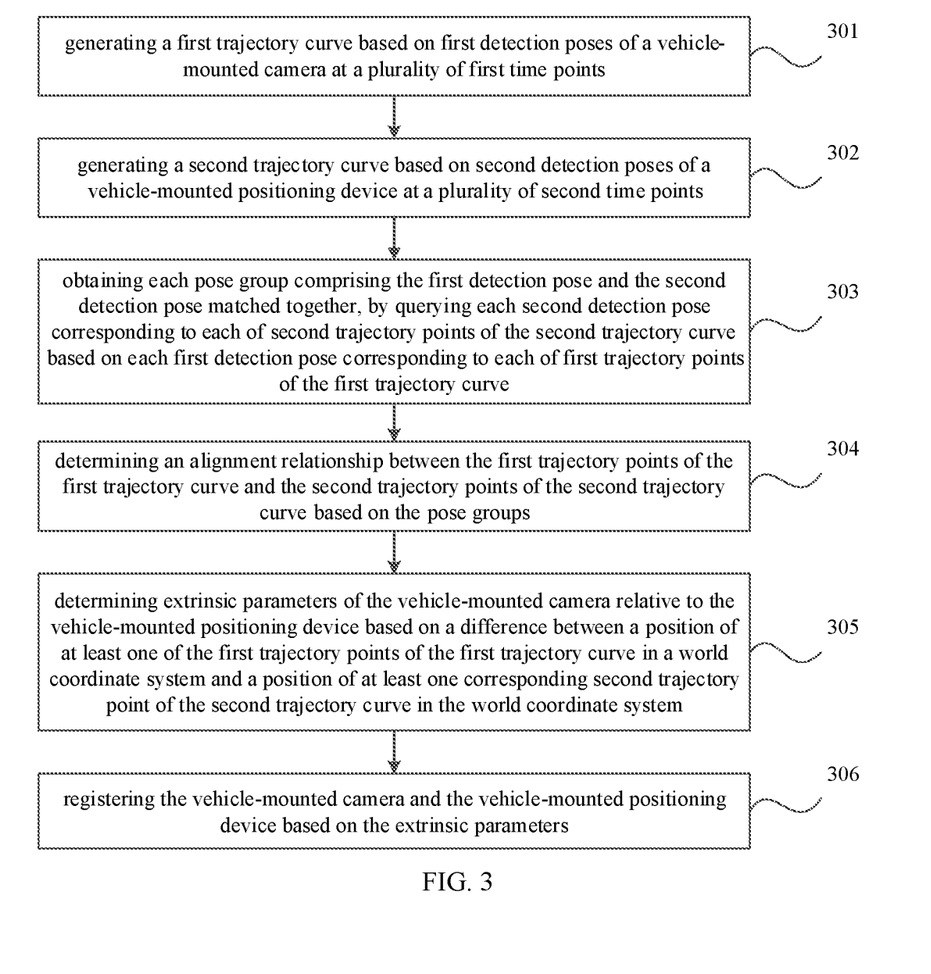
FIG. 3 is a flowchart illustrating a registration method for an autonomous vehicle according to a third embodiment of the disclosure.

FIG. 3 is a flowchart illustrating a registration method for an autonomous vehicle provided in a third embodiment of the disclosure.

As illustrated in FIG. 3, the registration method for the autonomous vehicle may include the following blocks.

At block 301, a first trajectory curve is generated based on first detection poses of a vehicle-mounted camera at a plurality of first time points.

At block 302, a second trajectory curve is generated based on second detection poses of a vehicle-mounted positioning device at a plurality of second time points.

At block 303, each pose group including the first detection pose and the second detection pose matched together is obtained by querying each second detection pose corresponding to each of second trajectory points of the second trajectory curve, based on each first detection pose corresponding to each of first trajectory points of the first trajectory curve.

At block 304, an alignment relationship between the first trajectory points of the first trajectory curve and the second trajectory points of the second trajectory curve is determined based on the pose groups.

The execution process of blocks 301 to 304 may refer to an execution process of any embodiment in the disclosure, which will not be repeated here.

At block 305, extrinsic parameters of the vehicle-mounted camera relative to the vehicle-mounted positioning device are determined based on a difference between a position of at least one of the first trajectory points of the first trajectory curve in a world coordinate system and a position of at least one corresponding second trajectory point of the second trajectory curve in the world coordinate system.

In the embodiment of the disclosure, each second trajectory point corresponding to each first trajectory point of the first trajectory curve in the second trajectory curve may be determined based on the alignment relationship, and the extrinsic parameters of the vehicle-mounted camera relative to the vehicle-mounted positioning device may be determined based on a difference between a three-dimensional position of each of the at least one first trajectory points in the world coordinate system and a three-dimensional position of the second trajectory point corresponding to the first trajectory point in the world coordinate system.

As an example, the position of each first trajectory point in the world coordinate system and the position of the second trajectory point corresponding to each first trajectory point in the world coordinate system may be substituted into the following formula (1) to obtain a plurality of equations:

extrinsic parameters×position of the first trajectory point in the world coordinate system*inverse matrix of the extrinsic parameters=position of the second trajectory point in the world coordinate system;    (1)

That is, in the disclosure, initial extrinsic parameters may be preset, and for each first trajectory point, the position of the first trajectory point in the world coordinate system and the position of the second trajectory point corresponding to the first trajectory point in the world coordinate system may be substituted into the formula (1) to obtain one equation. Difference operation is performed on left of the plurality of equations and right of the plurality of equations respectively to obtain a nonlinear optimization problem about the extrinsic parameters, and corrected extrinsic parameters are obtained by solving the nonlinear optimization problem.

At block 306, the vehicle-mounted camera and the vehicle-mounted positioning device are matched based on the extrinsic parameters.

In the embodiment of the disclosure, when the extrinsic parameters of the vehicle-mounted camera relative to the vehicle-mounted positioning device are determined, the vehicle-mounted camera and the vehicle-mounted positioning device may be registered based on the extrinsic parameters.

In the registration method for the autonomous vehicle in the embodiment of the disclosure, the extrinsic parameters of the vehicle-mounted camera relative to the vehicle-mounted positioning device are determined based on the difference between the position of each of the at least one first trajectory point of the first trajectory curve in the world coordinate system and the position of the corresponding second trajectory point of the second trajectory curve in the world coordinate system; and the vehicle-mounted camera and the vehicle-mounted positioning device are registered based on the extrinsic parameters. Therefore, the extrinsic parameters of the vehicle-mounted camera relative to the vehicle-mounted positioning device may be determined based on the difference between the position of the aligned first trajectory point and the position of the corresponding second trajectory point in the world coordinate system, which may improve accuracy of the extrinsic parameters determination result, thereby registering the vehicle-mounted camera and the vehicle-mounted positioning device based on the extrinsic parameters with relatively high accuracy, which may further improve accuracy of a calibration result.

In one possible implementation of the embodiment of the disclosure, in order to improve the accuracy of the determination result of the first detection pose corresponding to the vehicle-mounted camera, in the disclosure, features in a map may be configured to obtain a first detection pose of the vehicle-mounted camera at each first time point. In combination with a fourth embodiment, the above process is described as below.

Figure 4:
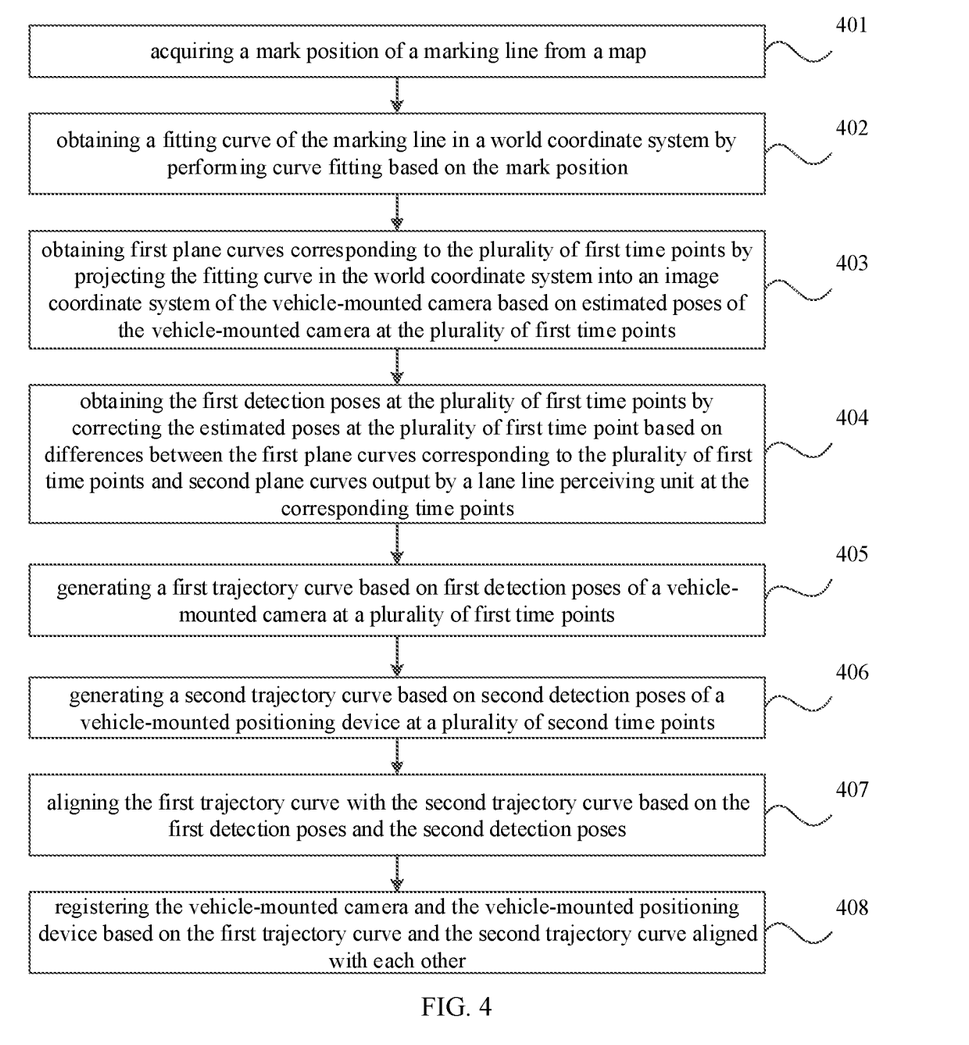
FIG. 4 is a flowchart illustrating a registration method for an autonomous vehicle according to a fourth embodiment of the disclosure.

FIG. 4 is a flowchart illustrating a registration method for an autonomous vehicle according to a fourth embodiment of the disclosure.

As illustrated in FIG. 4, the registration method for the autonomous vehicle may include the following blocks.

At block 401, a mark position of a marking line is acquired from a map.

In the embodiment of the disclosure, a marking line may be a traffic marking line, for example, may be a lane line.

In the embodiment of the disclosure, a vehicle may acquire the mark position of the marking line around the vehicle from a high precision map in a process of driving on a road.

At block 402, a fitting curve of the marking line in a world coordinate system is obtained by performing curve fitting based on the mark position.

In the embodiment of the disclosure, the curve fitting may be performed on the mark position of the marking line to obtain the fitting curve of the marking line in a world coordinate. For example, quadratic curve fitting may be performed on the marking line based on the mark position, to obtain a fitting curve or a curve equation of the marking line in a three-dimensional space.

At block 403, first plane curves corresponding to the plurality of first time points are obtained by projecting the fitting curve in the world coordinate system into an image coordinate system of the vehicle-mounted camera based on estimated poses of the vehicle-mounted camera at the plurality of first time points.

In the embodiment of the disclosure, the estimated pose of the vehicle-mounted camera at each first time point is determined based on an image acquired by the vehicle-mounted camera at the corresponding time point, that is, the estimated pose is a rough pose determined based on a visual positioning manner.

In the embodiment of the disclosure, first plane curves corresponding to the plurality of first time points are obtained by projecting the fitting curve of the marking line in the world coordinate system into an image coordinate system of the vehicle-mounted camera based on a relationship between the world coordinate system and the image coordinate system and the estimated poses of the vehicle-mounted camera at the plurality of first time points to. The first plane curve may be a two-dimensional curve equation.

At block 404, the first detection poses at the plurality of first time points are obtained by correcting the estimated poses at the plurality of first time point based on differences between the first plane curves corresponding to the plurality of first time points and second plane curves output by a lane line sensing unit at the corresponding time points.

In the embodiment of the disclosure, the lane line sensing unit in the vehicle may further be referred to as a lane line sensing module, and the lane line sensing unit is configured to detect a curve equation corresponding to the lane line and output a second plane curve corresponding to the lane line. The second plane curve may also be a two-dimensional curve equation.

In the embodiment of the disclosure, for each first time point, the estimated pose at the corresponding first time point is corrected based on the difference between the first plane curve corresponding to the first time point and the second plane curve output by the lane line sensing unit at the corresponding time point, and the corrected estimated pose may be determined as the first detection pose at the first time point.

At block 405, a first trajectory curve is generated based on first detection poses of a vehicle-mounted camera at a plurality of first time points.

At block 406, a second trajectory curve is generated based on second detection poses of a vehicle-mounted positioning device at a plurality of second time points.

At block 407, the first trajectory curve is aligned with the second trajectory curve based on the first detection poses and the second detection poses.

At block 408, the vehicle-mounted camera and the vehicle-mounted positioning device are registered based on the first trajectory curve and the second trajectory curve aligned with each other.

The execution process of blocks 405 to 408 may refer to an execution process of the above any embodiment in the disclosure, which will not be repeated here.

In the registration method for the autonomous vehicle in the embodiment of the disclosure, the pose of the vehicle-mounted camera is determined based on the mark line in the high precision map, and compared with an existing method for determining the pose of the vehicle-mounted camera based on key points on the image (a visual positioning manner), the method of the disclosure has high robustness, and more accurate trajectory calculation, so that a more accurate calibration parameter may be obtained.

In order to clearly describe how the estimated pose at each first time point is corrected in the above embodiment, the disclosure further provides a registration method for an autonomous vehicle.

Figure 5:
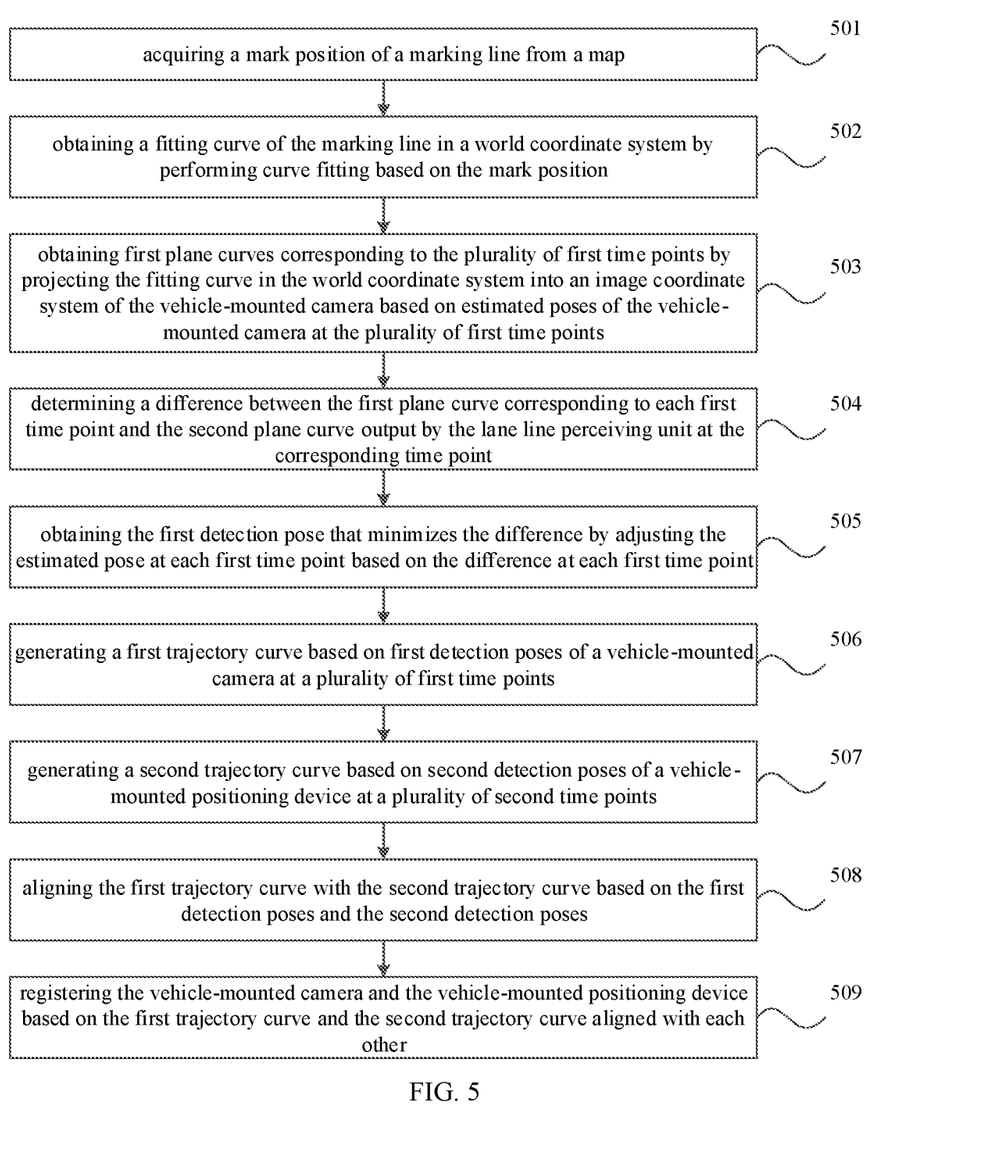
FIG. 5 is a flowchart illustrating a registration method for an autonomous vehicle according to a fifth embodiment of the disclosure.

FIG. 5 is a flowchart illustrating a registration method for an autonomous vehicle according to a fifth embodiment of the disclosure.

As illustrated in FIG. 5, the registration method for the autonomous vehicle may include the following blocks.

At block 501, a mark position of a marking line is acquired from a map.

At block 502, a fitting curve of the marking line in a world coordinate system is obtained by performing curve fitting based on the mark position.

At block 503, first plane curves corresponding to the plurality of first time points are obtained by projecting the fitting curve in the world coordinate system into an image coordinate system of the vehicle-mounted camera based on estimated poses of the vehicle-mounted camera at the plurality of first time points.

The execution process of blocks 501 to 503 may refer to an execution process of the above any embodiment in the disclosure, which will not be repeated here.

At block 504, a difference between the first plane curve corresponding to each first time point and the second plane curve output by the lane line sensing unit at the corresponding time point is determined.

In the embodiment of the disclosure, for any first time point, the difference between the first plane curve corresponding to the first time point and the second plane curve output by the lane line sensing unit at the first time point may be determined.

At block 505, the first detection pose that minimizes the difference is obtained by adjusting the estimated pose at each first time point based on the difference at each first time point.

In the embodiment of the disclosure, for any first time point, the estimated pose at the first time point may be adjusted based on the difference corresponding to the first time point to minimize the foregoing difference, so that the adjusted estimated pose that minimizes the difference may be determined as the first detection pose at the first time point.

In one possible implementation in the embodiment of the disclosure, for any first time point, the estimated pose at the first time point may be adjusted based on the difference at the first time point to minimize the foregoing difference based on a nonlinear optimization algorithm, so that the adjusted estimated pose that minimizes the difference may be determined as the first detection pose at the first time point.

As an example, for any first time point, a residual error may be constructed for parameters of two sets of two-dimensional curve equations of the first plane curve corresponding to the first time point and the second plane curve output by the lane line sensing unit at the corresponding time point, to obtain a nonlinear optimization problem of the pose of the vehicle-mounted camera in the world coordinate system. By solving the nonlinear optimization problem, the accurate pose of the vehicle-mounted camera in the world coordinate system may be obtained, and the accurate pose may be regarded as a first detection pose at the first time point.

In another possible implementation in the embodiment of the disclosure, for any first time point, pose adjustment may be further performed within a preset range based on the estimated pose at each first time point, to determine the pose that minimizes the difference in adjusted pose as the first detection pose at the first time point.

The preset range may be a relatively small value range.

Therefore, the first detection pose of the vehicle-mounted camera in the world coordinate system may be acquired based on the nonlinear optimization method, and the first detection pose of the vehicle-mounted camera in the world coordinate system may be acquired by windowing and sampling near the estimated pose of the vehicle-mounted camera, which may improve flexibility and applicability of the method.

At block 506, a first trajectory curve is generated based on first detection poses of a vehicle-mounted camera at a plurality of first time points.

At block 507, a second trajectory curve is generated based on second detection poses of a vehicle-mounted positioning device at a plurality of second time points.

At block 508, the first trajectory curve is aligned with the second trajectory curve based on the first detection poses and the second detection poses.

At block 509, the vehicle-mounted camera and the vehicle-mounted positioning device are registered based on the first trajectory curve and the second trajectory curve aligned with each other.

The execution process of blocks 506 to 509 may refer to an execution process of the above any embodiment in the disclosure, which will not be repeated here.

Figure 6:
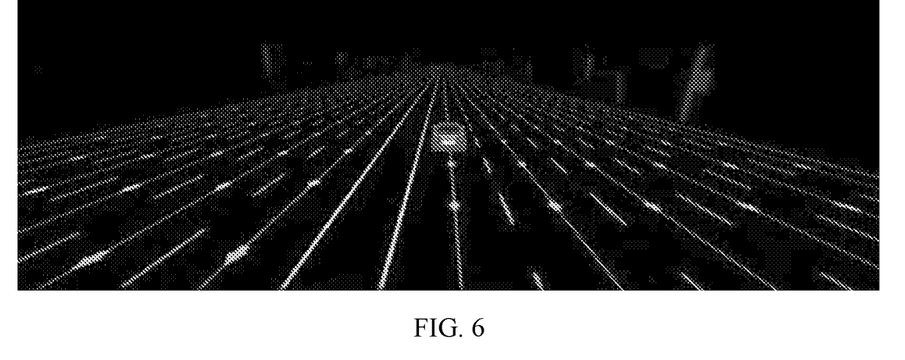
FIG. 6 is a schematic diagram illustrating a lane line in a map according to an embodiment of the disclosure.

As an example, a lane line in a map may be illustrated in FIG. 6 by taking a mark line as the lane line. The calibration process between a vehicle-mounted camera and a vehicle-mounted positioning device may include the following:

1. During a vehicle driving on the road, mark information of features around the vehicle may be queried to extract a mark position of the lane line around the vehicle. Quadratic curve fitting is performed on the lane line based on the mark position of the lane line to obtain a curve equation of the lane line in a three-dimensional space (denoted as a fitting curve in the disclosure).
2. Intrinsic parameters of a vehicle-mounted camera are pre-calibrated, and an equation of the lane line detected by the vehicle in real time(denoted as a second plane curve in the disclosure) is queried, and a two-dimensional curve equation in an image coordinate system (denoted as a first plane curve in the disclosure) projected from the curve equation of the three-dimensional lane line in the high precision map is obtained based on the intrinsic parameters of the vehicle-mounted camera and an estimated pose of the vehicle-mounted camera in the world coordinate system.
3. A residual error is constructed for the result of the lane line equation projection (i. e., the first plane curve) in the high precision map and the equation of the lane line (i. e., the second plane curve) detected at the vehicle side in real time, to obtain a nonlinear optimization problem related to the pose of the vehicle-mounted camera in the world coordinate system.
4. The above nonlinear optimization problem is solved to obtain an accurate pose of the vehicle-mounted camera in the world coordinate system (denoted as a first detection pose in the disclosure).
5. For second detection poses detected by a vehicle-mounted positioning device, discrete second detection poses may be fitted to obtain a trajectory equation continuous in time (denoted as a second trajectory curve in the disclosure) corresponding to the vehicle-mounted positioning device.

6. For each first detection pose solved at the fourth block, a series of equations may be obtained based on the formula (1) by querying the second detection pose aligned with the first detection pose in the second trajectory equation at the fifth block.
7. Difference operation is performed on left of the series of equations at the sixth block and right of the series of equations at the sixth block respectively, to obtain a nonlinear optimization problem about extrinsic parameters, and the nonlinear optimization problem may be solved to obtain corrected extrinsic parameters information of the vehicle-mounted camera relative to the vehicle-mounted positioning device.

Therefore, information marked in the high precision map may be fully utilized, to acquire the more accurate pose of the vehicle-mounted camera, and at the same time, the trajectory of the vehicle-mounted camera is aligned with the trajectory of the vehicle-mounted positioning device based on pose, which may avoid a poor calibration effect caused due to alignment based on time.

In the registration method for the autonomous vehicle in the embodiment of the disclosure, the estimated pose at each first time point is adjusted based on the difference between the first plane curve corresponding to the corresponding first time point and the second plane curve output by a lane line sensing unit at the corresponding time point, to obtain the first detection pose that minimizes difference. Therefore, the estimated pose of the vehicle-mounted camera is adjusted based on the difference between the first plane curve and the second plane curve to obtain the first detection pose with high accuracy, so that a calibration process is performed based on the first detection pose with high accuracy, which may improve accuracy of a calibration result.

Corresponding to the registration method for the autonomous vehicle provided in the embodiments in FIG. 1 to FIG. 5, the disclosure further provides a registration apparatus for an autonomous vehicle. Since the registration apparatus for an autonomous vehicle provided in the embodiment of the disclosure corresponds to the registration method for the autonomous vehicle provided in the embodiment in FIG. 1 to FIG. 5, the implementation of the registration method for the autonomous vehicle is also applied to the registration apparatus for an autonomous vehicle in the embodiment, which will not be described in the embodiment.

Figure 7:
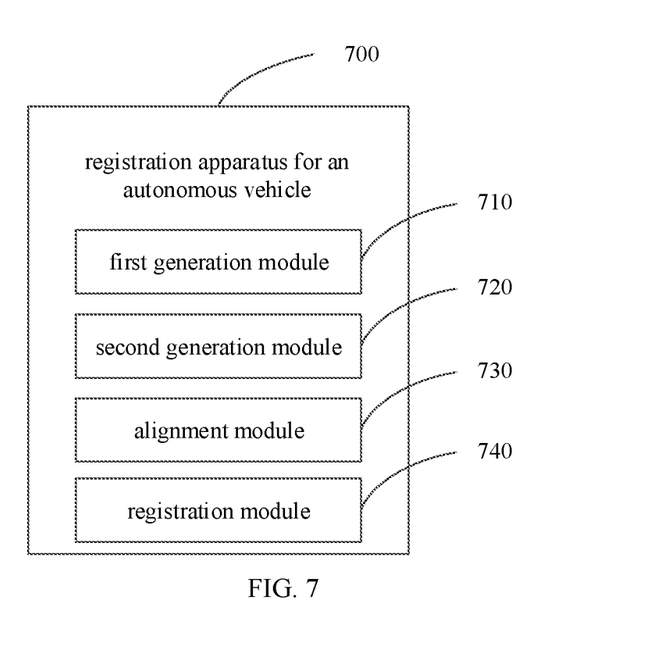
FIG. 7 is a block diagram illustrating a structure of a registration apparatus for an autonomous vehicle according to a sixth embodiment of the disclosure.

FIG. 7 is a diagram illustrating a structure of a registration apparatus for an autonomous vehicle provided in a sixth embodiment of the disclosure.

As illustrated in FIG. 7, the registration apparatus 700 for the autonomous vehicle may include a first generation module 710, a second generation module 720, an alignment module 730 and a registration module 740.

The first generation module 710 is configured to generate a first trajectory curve based on first detection poses of a vehicle-mounted camera at a plurality of first time points.

The second generation module 720 is configured to generate a second trajectory curve based on second detection poses of a vehicle-mounted positioning device at a plurality of second time points.

The alignment module 730 is configured to align the first trajectory curve with the second trajectory curve based on the first detection poses and the second detection poses.

The registration module 740 is configured to register the vehicle-mounted camera and the vehicle-mounted positioning device based on the first trajectory curve and the second trajectory curve aligned with each other.

In a possible implementation in the embodiment of the disclosure, the alignment module 730 is configured to: obtain each pose group comprising the first detection pose and the second detection pose matched together, by querying each second detection pose corresponding to each of second trajectory points of the second trajectory curve based on each first detection pose corresponding to each of first trajectory points of the first trajectory curve; and determine an alignment relationship between the first trajectory points of the first trajectory curve and the second trajectory points of the second trajectory curve based on the pose groups.

In a possible implementation in the embodiment of the disclosure, the registration module 740 is configured to: determine extrinsic parameters of the vehicle-mounted camera relative to the vehicle-mounted positioning device based on a difference between a position of at least one of the first trajectory points of the first trajectory curve in a world coordinate system and a position of at least one corresponding second trajectory point of the second trajectory curve in the world coordinate system; register the vehicle-mounted camera and the vehicle-mounted positioning device based on the extrinsic parameters.

In a possible implementation of the embodiment of the disclosure, the registration apparatus 700 may further include an acquiring module, a fitting module, a projection module and a correction module.

The acquiring module is configured to acquire a mark position of a marking line from a map.

The fitting module is configured to obtain a fitting curve of the marking line in a world coordinate system by performing curve fitting based on the mark position.

The projection module is configured to obtain first plane curves corresponding to the plurality of first time points by projecting the fitting curve in the world coordinate system into an image coordinate system of the vehicle-mounted camera based on estimated poses of the vehicle-mounted camera at the plurality of first time points.

The correction module is configured to obtain the first detection poses at the plurality of first time points by correcting the estimated poses at the plurality of first time point based on differences between the first plane curves corresponding to the plurality of first time points and second plane curves output by a lane line sensing unit at the corresponding time points.

In a possible implementation of the embodiment of the disclosure, the correction module may include a determining unit and an adjustment unit.

The determining unit is configured to determine a difference between the first plane curve corresponding to each first time point and the second plane curve output by the lane line sensing unit at the corresponding time point.

The adjustment unit is configured to obtain the first detection pose that minimizes the difference by adjusting the estimated pose at each first time point based on the difference at each first time point.

In a possible implementation of the embodiment of the disclosure, the adjustment unit is configured to: obtain the first detection pose that minimizes the difference by adjusting the estimated pose at each first time point based on the difference at each first time point through a nonlinear optimization algorithm; or, perform pose adjustment within a preset range based on the estimated pose at each first time point, to determine the pose that minimizes the difference in adjusted pose as the first detection pose at the corresponding first time point.

In the registration apparatus for the autonomous vehicle in the embodiment of the disclosure, the first trajectory curve is generated based on the first detection poses of the vehicle-mounted camera at the plurality of first time points, and the second trajectory curve is generated based on the second detection poses of the vehicle-mounted positioning device at the plurality of second time points, and the first trajectory curve is aligned with the second trajectory curve based on the first detection poses and the second detection poses, to register the vehicle-mounted camera and the vehicle-mounted positioning device based on the first trajectory curve and the second trajectory curve aligned with each other. Therefore, the first trajectory curve of the vehicle-mounted camera is aligned with the second trajectory curve of the vehicle-mounted positioning device based on pose, and the vehicle-mounted camera and the vehicle-mounted positioning device are registered based on the alignment result, which may avoid the poor registration effect (that is, the calibration effect) caused due to the alignment based on time, and improve the accuracy of the calibration result.

In order to achieve the above embodiment, an electronic device is further provided in the disclosure. The electronic device may include at least one processor; and a memory communicatively connected to the at least one processor; the memory is stored with instructions executable by the at least one processor, and the instructions are performed by the at least one processor, so that the at least one processor may perform the registration method for the autonomous vehicle provided in the above any embodiment of the disclosure.

In order to achieve the above embodiment, a non-transitory computer readable storage medium stored with computer instructions is further provided, the computer instructions are configured to perform the registration method for the autonomous vehicle as described in the above any embodiment of the disclosure by the computer.

In order to achieve the above embodiment, a computer program product including a computer program is further provided, the computer program is configured to perform the registration method for the autonomous vehicle as described in the above any embodiment of the disclosure when performed by a processor.

In order to achieve the above embodiment, an autonomous vehicle is further provided, and includes an electronic device as described in the above embodiment of the disclosure.

According to the embodiment of the disclosure, an electronic device, a readable storage medium and a computer program product are further provided in the disclosure.

Figure 8:
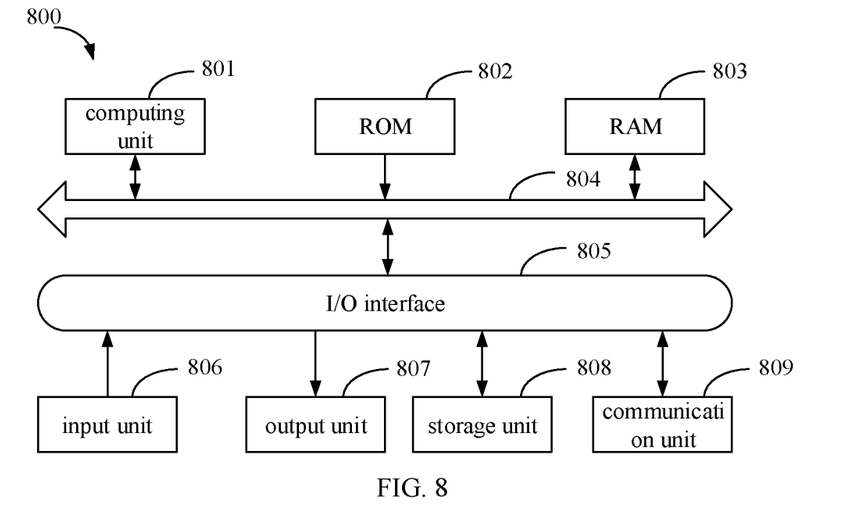
FIG. 8 is a block diagram illustrating an electronic device configured to implement embodiments of the disclosure.

FIG. 8 is a schematic block diagram illustrating an example electronic device configured to implement the embodiment of the disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 8, the device 800 includes a computing unit 801 configured to execute various appropriate actions and processings according to the computer program stored in a read-only memory (ROM) 802 or loaded from a storage unit 807 to a random access memory (RAM) 803. In a RAM 803, various programs and data required for a device 800 may be stored. A computing unit 801, a ROM 802 and a RAM 803 may be connected with each other by a bus 804. An input/output (I/O) interface 805 is also connected to a bus 804.

A plurality of components in the device 800 are connected to an I/O interface 805, and includes: an input unit 806, for example, a keyboard, a mouse, etc.; an output unit 807, for example various types of displays, speakers; a storage unit 808, for example a magnetic disk, an optical disk; and a communication unit 809, for example, a network card, a modem, a wireless transceiver. A communication unit 809 allows a device 800 to exchange information/data through a computer network such as internet and/or various types of telecommunication networks and other devices.

The computing unit 801 may be various types of general and/or dedicated processing components with processing and computing ability. Some examples of a computing unit 801 include but not limited to a central processing unit (CPU), a graphic processing unit (GPU), various dedicated artificial intelligence (AI) computing chips, various computing units running a machine learning model algorithm, a digital signal processor (DSP), and any appropriate processor, controller, microcontroller, etc. The computing unit 801 performs various methods and processings as described above, for example, the above registration method for the autonomous vehicle. For example, in some embodiments, the above registration method for the autonomous vehicle may be further achieved as a computer software program, which is physically contained in a machine readable medium, such as a storage unit 808. In some embodiments, a part or all of the computer program may be loaded and/or installed on the device 800 through a ROM 802 and/or a communication unit 809. When the computer program is loaded on a RAM 803 and performed by a computing unit 801, one or more blocks in the above registration method for the autonomous vehicle may be performed. Alternatively, in other embodiments, a computing unit 801 may be configured to perform the above registration method for the autonomous vehicle in other appropriate ways (for example, by virtue of a firmware).

Various implementation modes of systems and technologies described herein may be implemented in a digital electronic circuit system, an integrated circuit system, a field programmable gate array (FPGA), a dedicated application specific integrated circuit (ASIC), an application specific standard product (ASSP), a system on a chip (SoC), a complex programmable logic device (CPLD), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of multiple programming languages. These programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be executed completely or partly on the machine, executed partly on the machine as an independent software package and executed partly or completely on the remote machine or server.

In the context of the present disclosure, a machine-readable medium may be a tangible medium that may contain or store a program intended for use in or in conjunction with an instruction execution system, apparatus, or device. A machine readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a RAM, a ROM, an EPROM or a flash memory, an optical fiber device, and a compact disc read-only memory (CD-ROM), an optical storage device, a magnetic storage device, or any appropriate combination thereof.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may be further configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). The examples of a communication network include a Local Area Network (LAN), a Wide Area Network (WAN), an internet and a blockchain network.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

It should be noted that, Artificial intelligence (AI) is a subject that learns simulating certain thinking processes and intelligent behaviors (such as learning, reasoning, thinking, planning, etc.) of human beings by a computer, which covers hardware-level technologies and software-level technologies. AI hardware technologies generally include technologies such as sensors, dedicated AI chips, cloud computing, distributed storage, big data processing, etc.; AI software technologies mainly include computer vision technology, speech recognition technology, natural language processing (NLP) technology and machine learning (ML), deep learning (DL), big data processing technology, knowledge graph (KG) technology, etc.

In the technical solution in the embodiment of the disclosure, a first trajectory curve is generated based on first detection poses of a vehicle-mounted camera at a plurality of first time points, a second trajectory curve is generated based on second detection poses of a vehicle-mounted positioning device at a plurality of second time points, the first trajectory curve is aligned with the second trajectory curve based on the first detection poses and the second detection poses, and the vehicle-mounted camera and the vehicle-mounted positioning device are registered based on the first trajectory curve and the second trajectory curve aligned with each other. Therefore, the first trajectory curve of the vehicle-mounted camera is aligned with the second trajectory curve of the vehicle-mounted positioning device based on pose, and the vehicle-mounted camera and the vehicle-mounted positioning device are registered based on the alignment result, which may avoid a poor registration effect (that is, a calibration effect) caused due to alignment based on time, and improve accuracy of a calibration result.

It should be understood that, various forms of procedures shown above may be configured to reorder, add or delete blocks. For example, blocks described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A registration method for an autonomous vehicle, comprising:
generating a first trajectory curve based on first detection poses of a vehicle-mounted camera at a plurality of first time points, wherein the first detection pose comprises a pose of the vehicle-mounted camera in a world coordinate system;
generating a second trajectory curve based on second detection poses of a vehicle-mounted positioning device at a plurality of second time points, wherein the second detection pose comprises a pose detected by the vehicle-mounted positioning device;
aligning the first trajectory curve with the second trajectory curve based on the first detection poses and the second detection poses; and registering the vehicle-mounted camera and the vehicle-mounted positioning device based on the first trajectory curve and the second trajectory curve aligned with each other, wherein aligning the first trajectory curve with the second trajectory curve based on the first detection poses and the second detection poses, comprises:

obtaining each pose group comprising the first detection pose and the second detection pose matched together, by querying each second detection pose corresponding to each of second trajectory points of the second trajectory curve based on each first detection pose corresponding to each of first trajectory points of the first trajectory curve; and determining an alignment relationship between the first trajectory points of the first trajectory curve and the second trajectory points of the second trajectory curve based on the pose groups.

2. The method of claim 1, wherein registering the vehicle-mounted camera and the vehicle-mounted positioning device based on the first trajectory curve and the second trajectory curve aligned with each other, comprises:

determining extrinsic parameters of the vehicle-mounted camera relative to the vehicle-mounted positioning device based on a difference between a position of at least one of the first trajectory points of the first trajectory curve in a world coordinate system and a position of at least one corresponding second trajectory point of the second trajectory curve in the world coordinate system; and registering the vehicle-mounted camera and the vehicle-mounted positioning device based on the extrinsic parameters.

3. The method of claim 1, wherein, before generating the first trajectory curve based on the first detection poses of the vehicle-mounted camera at the plurality of the first time points, further comprising:

acquiring a mark position of a marking line from a map;

obtaining a fitting curve of the marking line in a world coordinate system by performing curve fitting based on the mark position;

obtaining first plane curves corresponding to the plurality of first time points by projecting the fitting curve in the world coordinate system into an image coordinate system of the vehicle-mounted camera based on estimated poses of the vehicle-mounted camera at the plurality of first time points; and obtaining the first detection poses at the plurality of first time points by correcting the estimated poses at the plurality of first time point based on differences between the first plane curves corresponding to the plurality of first time points and second plane curves output by a lane line sensor at the corresponding time points.

4. The method of claim 3, wherein, obtaining the first detection poses at the plurality of first time points by correcting the estimated poses at the plurality of first time point based on the differences between the first plane curves corresponding to the plurality of first time points and the second plane curves output by the lane line sensor at the corresponding time points comprises:

determining a difference between the first plane curve corresponding to each first time point and the second plane curve output by the lane line sensor at the corresponding time point; and obtaining the first detection pose that minimizes the difference by adjusting the estimated pose at each first time point based on the difference at each first time point.

5. The method of claim 4, wherein, obtaining the first detection pose that minimizes the difference by adjusting the estimated pose at each first time point based on the difference at each first time point comprises:

obtaining the first detection pose that minimizes the difference by adjusting the estimated pose at each first time point based on the difference at each first time point through a nonlinear optimization algorithm; or, performing pose adjustment within a preset range based on the estimated pose at each first time point, to determine the pose that minimizes the difference in adjusted pose as the first detection pose at the corresponding first time point.

6. A registration apparatus for an autonomous vehicle, comprising:

at least one processor; and a memory communicatively connected to the at least one processor, wherein the memory is stored with instructions executable by the at least one processor, and when the instructions is performed by the at least one processor, the at least one processor is configured to:

generate a first trajectory curve based on first detection poses of a vehicle-mounted camera at a plurality of first time points, wherein the first detection pose comprises a pose of the vehicle-mounted camera in a world coordinate system;

generate a second trajectory curve based on second detection poses of a vehicle-mounted positioning device at a plurality of second time points, wherein the second detection pose comprises a pose detected by the vehicle-mounted positioning device;

align the first trajectory curve with the second trajectory curve based on the first detection poses and the second detection poses; and register the vehicle-mounted camera and the vehicle-mounted positioning device based on the first trajectory curve and the second trajectory curve aligned with each other, the at least one processor is configured to:

obtain each pose group comprising the first detection pose and the second detection pose matched together, by querying each second detection pose corresponding to each of second trajectory points of the second trajectory curve based on each first detection pose corresponding to each of first trajectory points of the first trajectory curve; and determine an alignment relationship between the first trajectory points of the first trajectory curve and the second trajectory points of the second trajectory curve based on the pose groups.

7. The apparatus of claim 6, wherein the at least one processor is configured to:

determine extrinsic parameters of the vehicle-mounted camera relative to the vehicle-mounted positioning device based on a difference between a position of at least one of the first trajectory points of the first trajectory curve in a world coordinate system and a position of at least one corresponding second trajectory point of the second trajectory curve in the world coordinate system; and register the vehicle-mounted camera and the vehicle-mounted positioning device based on the extrinsic parameters.

8. The apparatus of claim 6, wherein, the at least one processor is configured to:
acquire a mark position of a marking line from a map;
obtain a fitting curve of the marking line in a world coordinate system by performing curve fitting based on the mark position;
obtain first plane curves corresponding to the plurality of first time points by projecting the fitting curve in the world coordinate system into an image coordinate system of the vehicle-mounted camera based on estimated poses of the vehicle-mounted camera at the plurality of first time points; and
obtain the first detection poses at the plurality of first time points by correcting the estimated poses at the plurality of first time point based on differences between the first plane curves corresponding to the plurality of first time points and second plane curves output by a lane line sensor at the corresponding time points.

9. The apparatus of claim 8, wherein, the at least one processor is configured to:
determine a difference between the first plane curve corresponding to each first time point and the second plane curve output by the lane line sensor at the corresponding time point; and
obtain the first detection pose that minimizes the difference by adjusting the estimated pose at each first time point based on the difference at each first time point.

10. The apparatus of claim 9, wherein, the at least one processor is configured to:
obtain the first detection pose that minimizes the difference by adjusting the estimated pose at each first time point based on the difference at each first time point through a nonlinear optimization algorithm; or,
perform pose adjustment within a preset range based on the estimated pose at each first time point, to determine the pose that minimizes the difference in adjusted pose as the first detection pose at the corresponding first time point.

11. A non-transitory computer readable storage medium stored with computer instructions, wherein, the computer instructions are configured to perform a registration method for an autonomous vehicle by the computer, and the method comprises:
generating a first trajectory curve based on first detection poses of a vehicle-mounted camera at a plurality of first time points, wherein the first detection pose comprises a pose of the vehicle-mounted camera in a world coordinate system;
generating a second trajectory curve based on second detection poses of a vehicle-mounted positioning device at a plurality of second time points, wherein the second detection pose comprises a pose detected by the vehicle-mounted positioning device;
aligning the first trajectory curve with the second trajectory curve based on the first detection poses and the second detection poses; and
registering the vehicle-mounted camera and the vehicle-mounted positioning device based on the first trajectory curve and the second trajectory curve aligned with each other, wherein
aligning the first trajectory curve with the second trajectory curve based on the first detection poses and the second detection poses, comprises:
obtaining each pose group comprising the first detection pose and the second detection pose matched together, by querying each second detection pose corresponding to each of second trajectory points of the second trajectory curve based on each first detection pose corresponding to each of first trajectory points of the first trajectory curve; and
determining an alignment relationship between the first trajectory points of the first trajectory curve and the second trajectory points of the second trajectory curve based on the pose groups.

12. The storage medium of claim 11, wherein registering the vehicle-mounted camera and the vehicle-mounted positioning device based on the first trajectory curve and the second trajectory curve aligned with each other, comprises:
determining extrinsic parameters of the vehicle-mounted camera relative to the vehicle-mounted positioning device based on a difference between a position of at least one of the first trajectory points of the first trajectory curve in a world coordinate system and a position of at least one corresponding second trajectory point of the second trajectory curve in the world coordinate system; and
registering the vehicle-mounted camera and the vehicle-mounted positioning device based on the extrinsic parameters.

13. The storage medium of claim 11, wherein, before generating the first trajectory curve based on the first detection poses of the vehicle-mounted camera at the plurality of the first time points, further comprising:
acquiring a mark position of a marking line from a map;
obtaining a fitting curve of the marking line in a world coordinate system by performing curve fitting based on the mark position;
obtaining first plane curves corresponding to the plurality of first time points by projecting the fitting curve in the world coordinate system into an image coordinate system of the vehicle-mounted camera based on estimated poses of the vehicle-mounted camera at the plurality of first time points; and
obtaining the first detection poses at the plurality of first time points by correcting the estimated poses at the plurality of first time point based on differences between the first plane curves corresponding to the plurality of first time points and second plane curves output by a lane line sensor at the corresponding time points.

14. The storage medium of claim 13, wherein, obtaining the first detection poses at the plurality of first time points by correcting the estimated poses at the plurality of first time point based on the differences between the first plane curves corresponding to the plurality of first time points and the second plane curves output by the lane line sensor at the corresponding time points comprises:
determining a difference between the first plane curve corresponding to each first time point and the second plane curve output by the lane line sensor at the corresponding time point; and
obtaining the first detection pose that minimizes the difference by adjusting the estimated pose at each first time point based on the difference at each first time point.

15. The storage medium of claim 14, wherein, obtaining the first detection pose that minimizes the difference by adjusting the estimated pose at each first time point based on the difference at each first time point comprises:

obtaining the first detection pose that minimizes the difference by adjusting the estimated pose at each first time point based on the difference at each first time point through a nonlinear optimization algorithm; or, performing pose adjustment within a preset range based on the estimated pose at each first time point, to determine the pose that minimizes the difference in adjusted pose as the first detection pose at the corresponding first time point.

* * * * *